(12) United States Patent
Baldwin (10) Patent No.: US 11,217,977 B1
(45) Date of Patent: Jan. 4, 2022

(54) COLOR CHANGING FLOOR OUTLET COVER

(71) Applicant: Jeffrey P. Baldwin, Anthem, AZ (US)

(72) Inventor: Jeffrey P. Baldwin, Anthem, AZ (US)

( * ) Notice: Subject to any disclaimer, the term of this patent is extended or adjusted under 35 U.S.C. 154(b) by 84 days.

(21) Appl. No.: 16/697,532

(22) Filed: Nov. 27, 2019

Related U.S. Application Data (60) Provisional application No. 62/772,110, filed on Nov. 28, 2018.

(51) Int. Cl.
| | | |
|---|---|---|
| *H01R 13/44* | (2006.01) | |
| *H02G 3/14* | (2006.01) | |
| *H01R 13/447* | (2006.01) | |
| *H02G 3/18* | (2006.01) | |
| *H02G 3/08* | (2006.01) | |
| *H01R 13/453* | (2006.01) | |

(52) U.S. Cl.
CPC ............... *H02G 3/14* (2013.01); *H01R 13/44* (2013.01); *H01R 13/447* (2013.01); *H01R 13/453* (2013.01); *H02G 3/081* (2013.01); *H02G 3/088* (2013.01); *H02G 3/185* (2013.01)

(58) Field of Classification Search
CPC .......... H02G 3/14; H02G 3/185; H02G 3/081; H02G 3/088; H02G 3/08; H01R 13/447; H01R 13/44; H01R 13/443; H01R 13/453; B65D 51/245
USPC .................................... 220/3.3, 3.8; 215/230
See application file for complete search history.

(56) References Cited

U.S. PATENT DOCUMENTS

| | | | | |
|---|---|---|---|---|
| 4,228,317 A | * | 10/1980 | Cziment | H01R 13/447 174/67 |
| 2002/0096350 A1 | * | 7/2002 | Young | H02G 3/185 174/67 |
| 2003/0109172 A1 | * | 6/2003 | Foden | E04B 5/48 439/535 |
| 2011/0228552 A1 | * | 9/2011 | Kevelos | H01H 13/83 362/558 |
| 2020/0052432 A1 | * | 2/2020 | Byrne | H01R 13/5202 |
| 2020/0412070 A1 | * | 12/2020 | Owen | H05K 5/03 |

* cited by examiner

*Primary Examiner* — Steven T Sawyer
(74) *Attorney, Agent, or Firm* — Booth Udall Fuller, PLC (57) ABSTRACT

A floor electrical outlet cover may be disposed over and coupled to a floor electrical outlet, the floor electrical outlet cover comprising a first color and further comprising at least one opening aligned with the floor electrical outlet, and at least one flap coupled to the floor electrical outlet cover, the flap configured to move from a closed position that restricts access to the floor electrical outlet to an open position that provides access to the floor electrical outlet. A colored electrical plate cover may comprise a second color different from the first color and a structural element coupled to the floor electrical outlet cover. The colored electrical plate cover may further comprise at least one opening aligned with the at least one opening in the floor electrical outlet cover. At least one colored flap cover may be coupled to the flap.

18 Claims, 11 Drawing Sheets

COLOR CHANGING FLOOR OUTLET COVER

CROSS REFERENCE TO RELATED APPLICATIONS

This application claims the benefit of the filing date of U.S. Provisional Patent Application 62/772,110 entitled "Horizontal Surface Enclosures" to Jeffrey P. Baldwin that was filed on Nov. 28, 2018, the disclosure of which is hereby incorporated herein by this reference.

TECHNICAL FIELD

Aspects of this document relate generally to a colored floor outlet cover.

BACKGROUND

Outlet covers are used on floors and horizontal surfaces to reduce or prevent water, dirt, or other contaminants from entering the electrical outlet.

SUMMARY

Aspects of this document relate to electrical outlet covers which may comprise a colored electrical plate cover configured to be coupled to a floor electrical outlet cover comprising a first color. A floor electrical outlet cover may be disposed over and coupled to the floor electrical outlet. The floor electrical outlet cover may comprise a first color. The floor electrical outlet cover may further comprise at least one opening aligned with the floor electrical outlet. At least one hinged flap may be hingedly coupled to the floor electrical outlet cover, the hinged flap configured to move from a closed position that restricts access to the floor electrical outlet to an open position that provides access to the floor electrical outlet. A colored electrical plate cover may comprise a second color different from the first color and comprise a structural element with portions of the structural element positioned on opposing sides of the colored electrical plate cover. The structural element may be configured to couple the colored electrical plate cover to the floor electrical outlet cover. The colored electrical plate cover may further comprise at least one opening aligned with the at least one opening in the floor electrical outlet cover. The at least one opening may provide a gap between a perimeter of the at least one opening and the at least one hinged flap. At least one colored hinged flap cover may comprise at least one tab to mateably snap-fit to the hinged flap, the at least one tab sized to fit within the gap between the perimeter of the at least one opening and the at least one hinged flap. A fastener may be disposed adjacent the at least one colored hinged flap, the fastener configured to move from a closed position that restricts opening the hinged flap to an open position that allows for unrestricted opening of the hinged flap.

Particular embodiments may comprise one or more of the following features. The fastener may comprise a rounded head and a straight edge along a portion of a perimeter the head. The floor electrical outlet cover may be coupled to the floor electrical outlet with a gasket disposed between the floor electrical outlet cover and the floor electrical outlet such that the floor electrical outlet cover passes a water scrub test. The structural element may comprise tracks in the colored electrical plate cover aligned with screws in the floor electrical outlet cover. The structural element may comprise corresponding tracks formed as grooves or ridges in the colored electrical plate cover and the floor electrical outlet cover to facilitate sliding of the colored electrical plate cover onto the floor electrical outlet cover. The structural element may comprise tabs or recesses formed on opposing ends of the colored electrical plate cover configured to snap fit to the floor electrical outlet cover. The structural element may comprise an adhesive or double-sided tape disposed between the colored electrical plate cover and the floor electrical outlet cover. The second color may comprise a brass, nickel, gray, silver, or gold color. The fastener may comprise a black color. The colored electrical plate cover may be removably coupled to the floor electrical outlet cover and the colored electrical plate cover may mask any fasteners used to attach the floor electrical outlet cover to the floor electrical outlet.

According to an aspect, a colored electrical plate cover may be configured to be coupled to a floor electrical outlet cover comprising a first color. A floor electrical outlet cover may be disposed over and coupled to the floor electrical outlet. The floor electrical outlet cover may comprise a first color. The floor electrical outlet cover may further comprise at least one opening aligned with the floor electrical outlet. At least one flap may be coupled to the floor electrical outlet cover, the flap configured to move from a closed position that restricts access to the floor electrical outlet to an open position that provides access to the floor electrical outlet. A colored electrical plate cover may comprise a second color different from the first color and comprise a structural element configured to couple the colored electrical plate cover to the floor electrical outlet cover. The colored electrical plate cover may further comprise at least one opening aligned with the at least one opening in the floor electrical outlet cover. The at least one colored flap cover may be coupled to the flap.

Particular embodiments may comprise one or more of the following features. The at least one flap may comprise at least one hinged flap hingedly coupled to the floor electrical outlet cover. Portions of the structural element may be positioned on opposing sides of the colored electrical plate cover. The structural element may comprise tabs or recesses formed on opposing ends of the colored electrical plate cover configured to snap fit to the floor electrical outlet cover. The at least one opening of the colored electrical plate cover may be sized such that it provides a gap between a perimeter of the at least one opening of the colored electrical plate cover and the at least one flap. The at least one colored flap cover may comprise at least one tab to mateably snap-fit to the flap. The at least one tab may be sized to fit within the gap between the perimeter of the at least one opening and the at least one flap.

According to an aspect, a colored electrical plate cover may be configured to be coupled to a floor electrical outlet cover comprising a first color. A colored electrical plate cover may comprise a second color different from the first color and comprise a structural element configured to couple the colored electrical plate cover to the floor electrical outlet cover. The colored electrical plate cover may further comprise at least one opening aligned with an opening in the floor electrical outlet cover. At least one colored flap may be configured to cover the opening in the floor electrical outlet cover, the at least on colored flap configured to move from a closed position that restricts access to the floor electrical outlet to an open position that provides access to the floor electrical outlet.

Particular embodiments may comprise one or more of the following features. The at least one flap may comprise at least one hinged flap hingedly coupled to the floor electrical outlet cover. Portions of the structural element may be positioned on opposing sides of the colored electrical plate cover. The at least one opening of the colored electrical plate cover may be sized such that it provides a gap between a perimeter of the at least one opening of the colored electrical plate cover and the at least one flap. The at least one colored flap cover may comprise at least one tab to mateably snap-fit to the flap. The at least one tab may be sized to fit within the gap between the perimeter of the at least one opening and the at least one flap. The structural element may comprise tabs or recesses formed on opposing ends of the colored electrical plate cover and be configured to snap fit to the floor electrical outlet cover.

The foregoing and other aspects, features, applications, and advantages will be apparent to those of ordinary skill in the art from the specification, drawings, and the claims. Unless specifically noted, it is intended that the words and phrases in the specification and the claims be given their plain, ordinary, and accustomed meaning to those of ordinary skill in the applicable arts. The inventors are fully aware that he can be his own lexicographer if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those of ordinary skill in the art from the specification, drawings, and the claims.

BRIEF DESCRIPTION OF THE DRAWINGS

Implementations will hereinafter be described in conjunction with the appended drawings, where like designations denote like elements, and.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations.

DETAILED DESCRIPTION

This document features a colored electrical floor outlet cover. There are many features of an outlet cover and method implementations disclosed herein, of which one, a plurality, or all features or steps may be used in any particular implementation.

In the following description, reference is made to the accompanying drawings which form a part hereof, and which show by way of illustration possible implementations.

It is to be understood that other implementations may be utilized, and structural, as well as procedural, changes may be made without departing from the scope of this document. As a matter of convenience, various components will be described using exemplary materials, sizes, shapes, dimensions, and the like. However, this document is not limited to the stated examples and other configurations are possible and within the teachings of the present disclosure. As will become apparent, changes may be made in the function and/or arrangement of any of the elements described in the disclosed exemplary implementations without departing from the spirit and scope of this disclosure.

Figure 1:
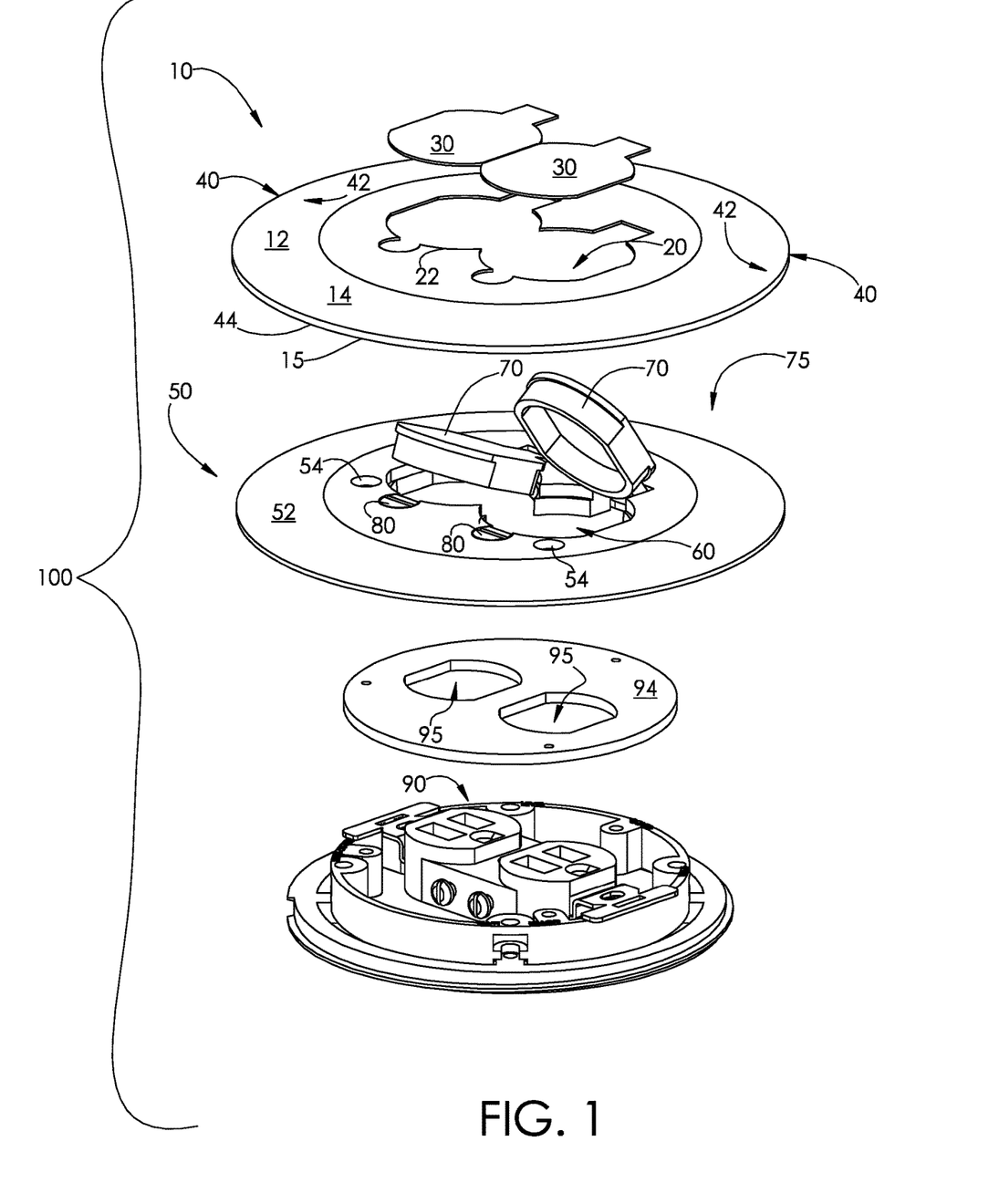
FIG. 1 depicts an exploded perspective view of a colored electrical plate cover over a floor electrical outlet cover.

FIG. 1 depicts an exploded perspective view of a non-limiting implementation of an assembly 100 comprising a colored electrical plate cover or faceplate 10 configured to be coupled to a floor electrical outlet cover or base 50, the floor electrical outlet cover 50 comprising a first color 52. The colored electrical plate cover or faceplate 10 may closely approximate the outer dimensions of the floor electrical outlet cover 50. In some instances, a thickness of the colored electrical plate cover or faceplate 10 can be in a range of 0.5 millimeters (mm) to 4 mm. The floor electrical outlet cover 50 may further comprise at least one opening 60 aligned with the floor electrical outlet 90, so that the electrical outlet 90 may be accessed and electrically coupled to power cords and various devices even when the electrical outlet cover 50 is coupled to the floor electrical outlet 90. The floor electrical outlet cover 50 may also comprise at least one hinged flap, flap, or closure plug 70 hingedly coupled to the floor electrical outlet cover 50, the hinged flap 70 configured to move from a closed position 74 that restricts access to the floor electrical outlet to an open position 75 that provides access to the floor electrical outlet 90.

The colored electrical plate cover 10 may comprise a second color 12 different from the first color 52, the second color 12 being a desired color or ornamental color to be displayed and visible to observers, such as brass, nickel, gray, silver, chrome, or gold color. While a number of non-limiting colors have been provided as examples, a person of ordinary skill will appreciate that the color combinations that may be supplied are universal. The second color 12, which is the color of the colored electrical plate cover 10, may also be of any desired suitable color, color-scheme, pattern, texture, or design that fits with a color-scheme, decorating motif, or style that is desired, and replace the first color 52 of the floor electrical outlet cover that would otherwise be visible.

The colored electrical plate cover 10 may also cover, hide, or obscure mounting holes 54 in the floor electrical outlet cover 50 that are included in the floor electrical outlet 50 for receiving mounting screws, fasteners, or devices, for securing the floor electrical outlet cover 50 to the floor.

The colored electrical plate cover 10 may comprise a structural element 40 with portions of the structural element 40 positioned on opposing sides, portions, locations, or along or near a perimeter, of the colored electrical plate cover 10. The structural element 40 may comprise one of more portions, and may be configured to couple the colored electrical plate cover 10 to the floor electrical outlet cover 50. The structural element 40 may comprise one or more one or more tracks, tabs, clips, channels, grooves, recesses, flanges, bezels, or ridges, screw, adhesive or glue. The portions of the structural element 40 may be disposed at opposing sides, portions, locations, or along or near a perimeter 42 of the colored electrical plate cover 10. The structural element 40 of the colored electrical plate cover 10 may correspond to and mateably couple with one or more recesses, cut-outs, or notches 56 configured to receive the structural element 40, such as by a snap-fit, press-fit, twits, rotation, or other suitable mechanical or chemical form of attachment.

Figure 12:
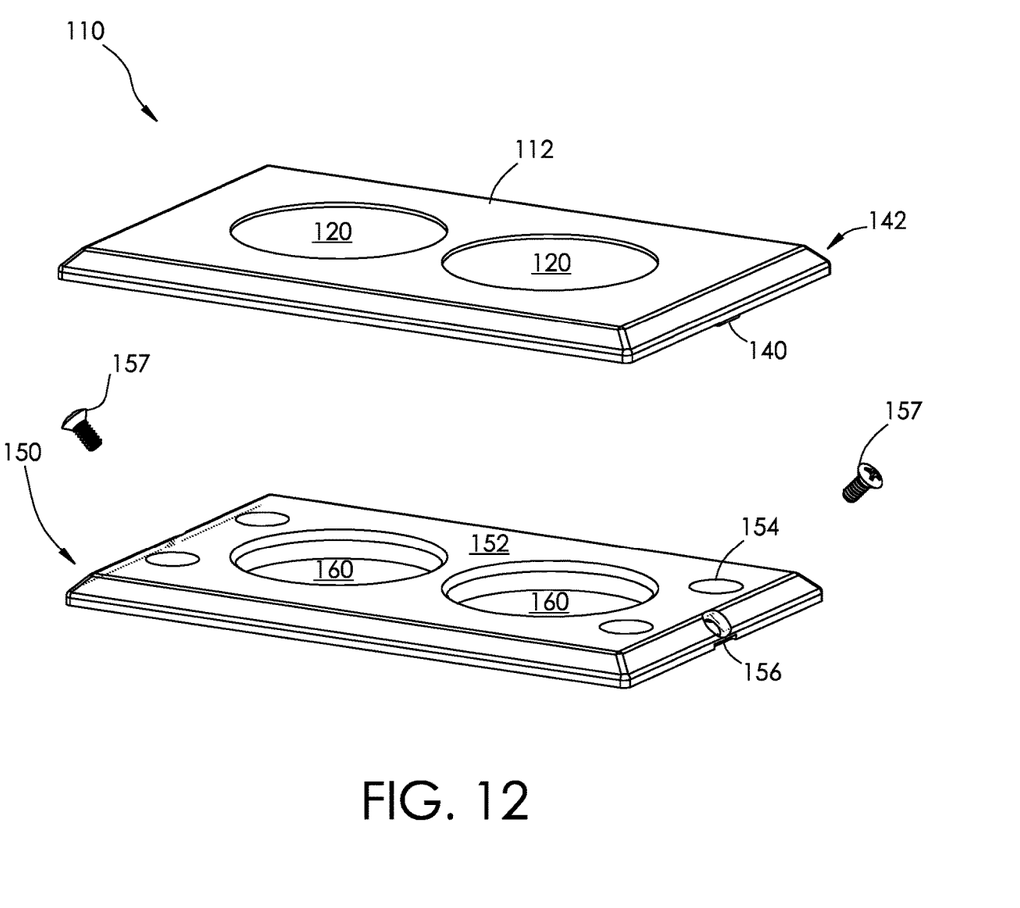
FIG. 12 depicts another exploded perspective view of a colored electrical plate cover over a floor electrical outlet cover.
Figure 13A:
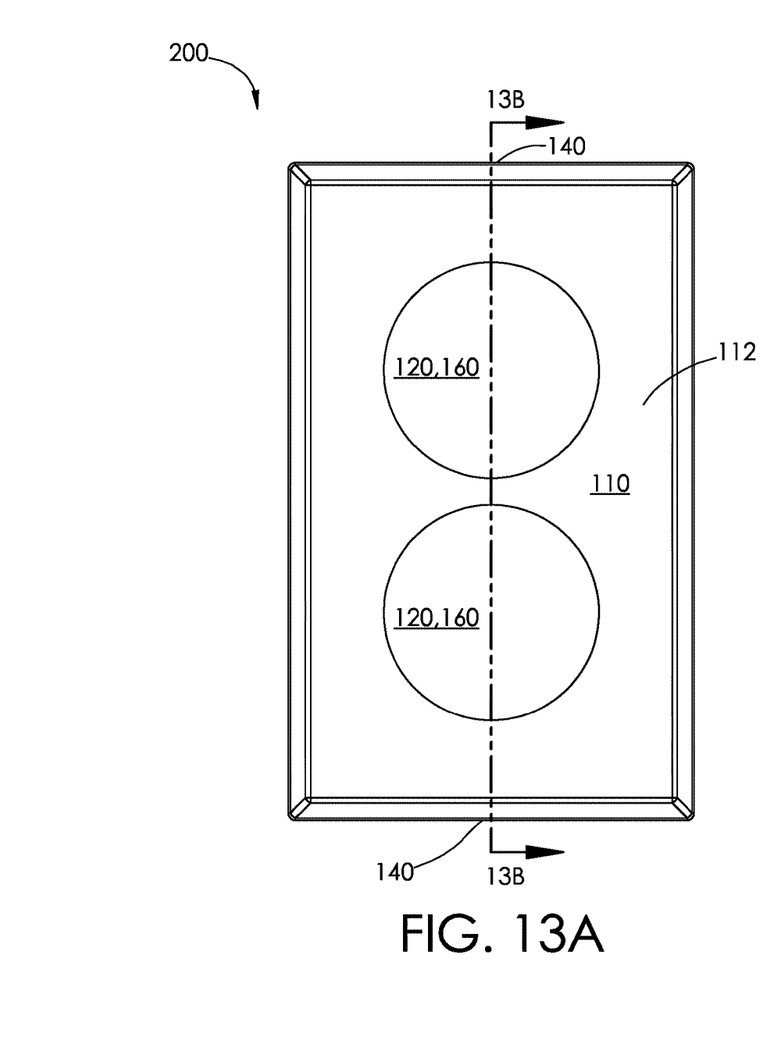
FIG. 13A depicts a plan view of the assembly shown in FIG. 12, with a section line 13B-13B taken along the assembly.
Figure 13B:
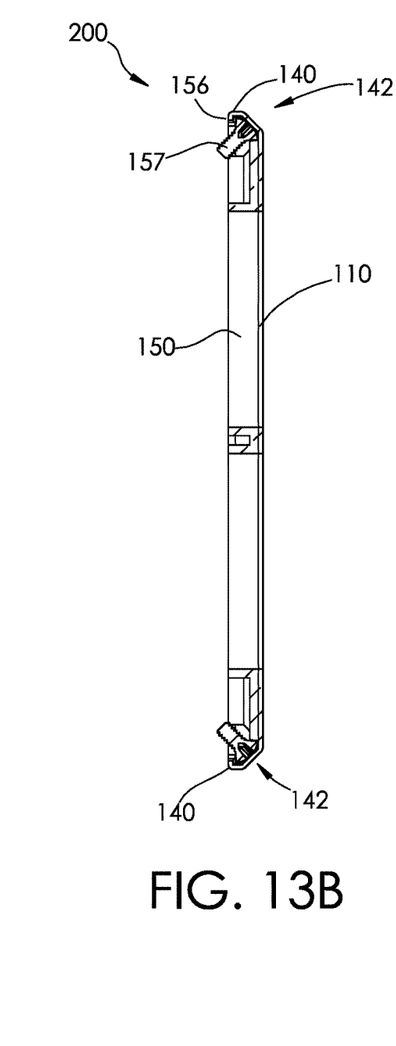
FIG. 13B shows a cross-sectional profile view of the assembly taken along the section line 13B-13B shown in FIG. 13A.

In some instances, the structural element 40 may align with fasteners or screws in the floor electrical outlet cover 50, as shown, e.g., in FIGS. 12 and 13B. In other instances, the structural element 40 may correspond to, and mateably couple with, one of more features in the floor electrical outlet cover 50, to facilitate sliding of the colored electrical plate cover 10 onto the floor electrical outlet cover 50. In other instances, the structural element 40 may correspond to, and mateably couple with, one of more features in the floor electrical outlet cover 50, configured to snap fit to the floor electrical outlet cover. In yet other instances, the structural element 40 may comprise an adhesive, glue, or double-sided tape 44 disposed between the colored electrical plate cover 10 and the floor electrical outlet cover 50.

The colored electrical plate cover 10 may further comprise at least one opening 20 that extends completely through the colored electrical plate cover 10 from a top surface 14 of the plate cover 10 to a bottom surface 15 of the plate cover 10 opposite the top surface 15. The opening 20 may be aligned with the at least one opening 60 in the floor electrical outlet cover 50, to provide access to the floor electrical outlet 90. The opening 20 may also providing a gap G between a perimeter 22 of the at least one opening 20 and the at least one hinged flap 70, or in other words, between the perimeter 22 of the at least one opening 20 and the perimeter 72 of the at least one hinged flap 70. At least one colored hinged flap cover, colored flap cover, hinged flap cover, flap cover, or closure plug cover 30 may comprise at least one tab, flange, or clip 34 to mateably couple, snap-fit, press-fit, or friction fit the hinged flap cover 30 to the hinged flap 70. Examples of the hinged flap cover 30 comprising tabs 34 and its coupling to the hinged flap 70 are shown, e.g., in FIGS. 5-8. The at least one tab 34 may be sized to fit within the gap G that extends between the perimeter 22 of the at least one opening 20 and the at least one hinged flap 70.

A fastener 80 may be disposed adjacent the at least one colored hinged flap 30, the fastener 80 configured to move from a closed position 82 that restricts opening the hinged flap 70 and the colored hinged flap 30, to an open position 84 that allows for unrestricted opening of the hinged flap 70 and the colored hinged flap 30. The fastener may comprise a freely-rotating piece, a spring-loaded latch, a sliding button, or any other suitable or desirable structure for allowing for, or restricting, the opening of the hinged flap 70 and the colored hinged flap 30. The fastener 80 may comprise a rounded head 86 and a straight edge 87 along a portion of a perimeter 88 of the rounded head 86. The fasteners 80 may be formed of, or colored with, black, dark color, or a neutral color so that a single fastener or set of fasteners 80 will match or accommodate any range, or a plurality of, colored electrical plate covers 10.

The floor electrical outlet cover 50 may be coupled to the floor electrical outlet 90 with a gasket 94 disposed between the floor electrical outlet cover 50 and the floor electrical outlet 90 such that the floor electrical outlet cover 50 passes a water scrub test. In other words, the gasket may provide sufficient friction against the floor electrical outlet cover 50 or between the floor electrical outlet cover 50 and the floor electrical outlet 90, so as to limit or reduce an amount of water that may pass from outside the floor electrical outlet cover 50 to the floor electrical outlet 90. The gasket 94 may be formed of foam, rubber, polymer, or any other suitable material that is resilient, compliant, or elastically deformable. The gasket 94 may also comprise at least one opening 95 formed through the gasket 94 and aligned with the at least one opening 20, the at least one opening 60, and the floor electrical outlet 90.

The colored electrical plate cover 10 may be removably coupled to the floor electrical outlet cover 50 and the colored electrical plate cover 10 may mask any fasteners, screws, bolts, or other hardware used to attach the floor electrical outlet cover 50 to the floor electrical outlet 90. Two or more colored electrical plate covers 10 may be provided with or without a floor electrical outlet cover 10, as a kit or unit, so as to provide the user or installer a number or plurality of options for an outlet cover, which may be desirably adjusted at a time of installation based on considerations particular to an installation site or location. By providing multiple colored electrical plate covers compatible with a single generic floor electrical outlet cover or base 50, a user may have, and maintain, multiple options for selecting a desired color without purchasing additional or excess floor electrical outlet covers 50.

Figure 2:
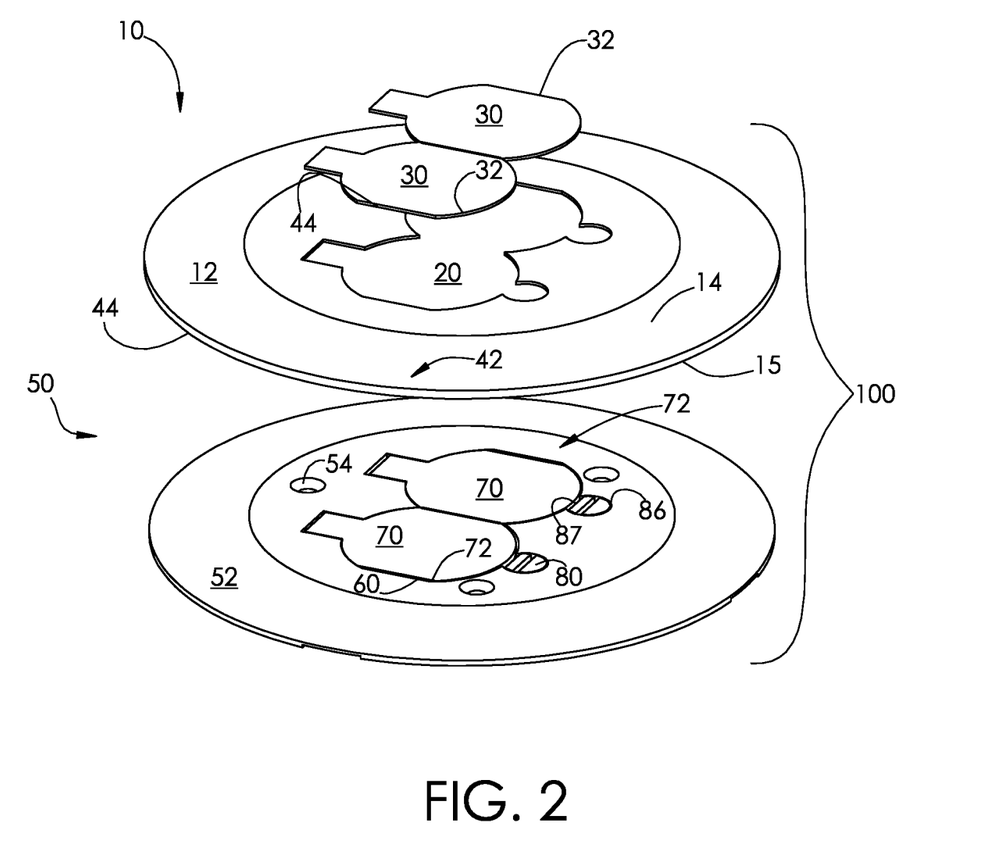
FIG. 2 depicts another exploded perspective view of a colored electrical plate cover over a floor electrical outlet cover.

FIG. 2 depicts another exploded perspective view of a non-limiting implementation of an assembly 100 comprising the colored electrical plate cover 10 configured to be coupled to a floor electrical outlet cover 50, the floor electrical outlet cover 50 comprising a first color 52. The colored electrical plate cover 10 shown in FIG. 2 comprises colored hinged flap covers 30 without tabs 34, the colored hinged flap covers 30 configured to be coupled to the hinged flaps 70 with adhesive, glue, or double-sided tape 44. FIG. 2 also differs from FIG. 1 by not showing the gasket 94 and the floor electrical outlet 90, which a POSA will understand may also be part of the assembly 100, but have been omitted from the various views for ease of illustration.

Figure 3:
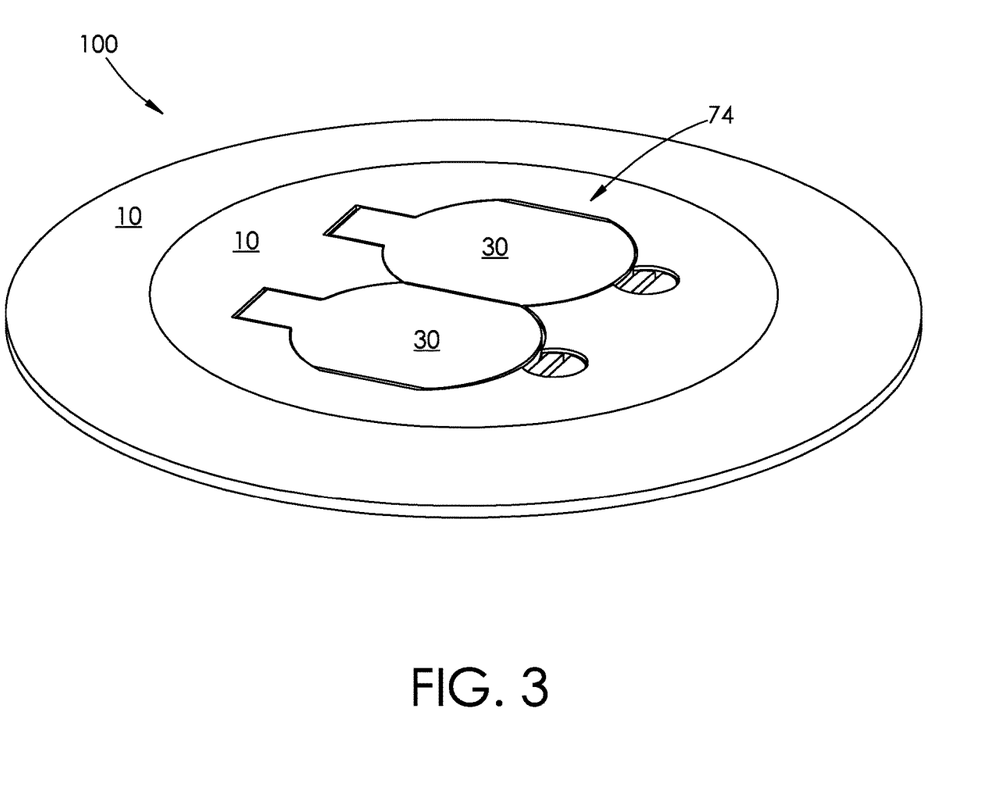
FIG. 3 depicts another non-exploded perspective view of a colored electrical plate cover coupled to a floor electrical outlet cover.

FIG. 3 depicts a non-exploded perspective view of the assembly 100 from FIGS. 1 and 2, with the colored electrical plate cover 10 coupled to the floor electrical outlet cover 50 with adhesive, glue, or double-sided tape 44.

Figure 4A:
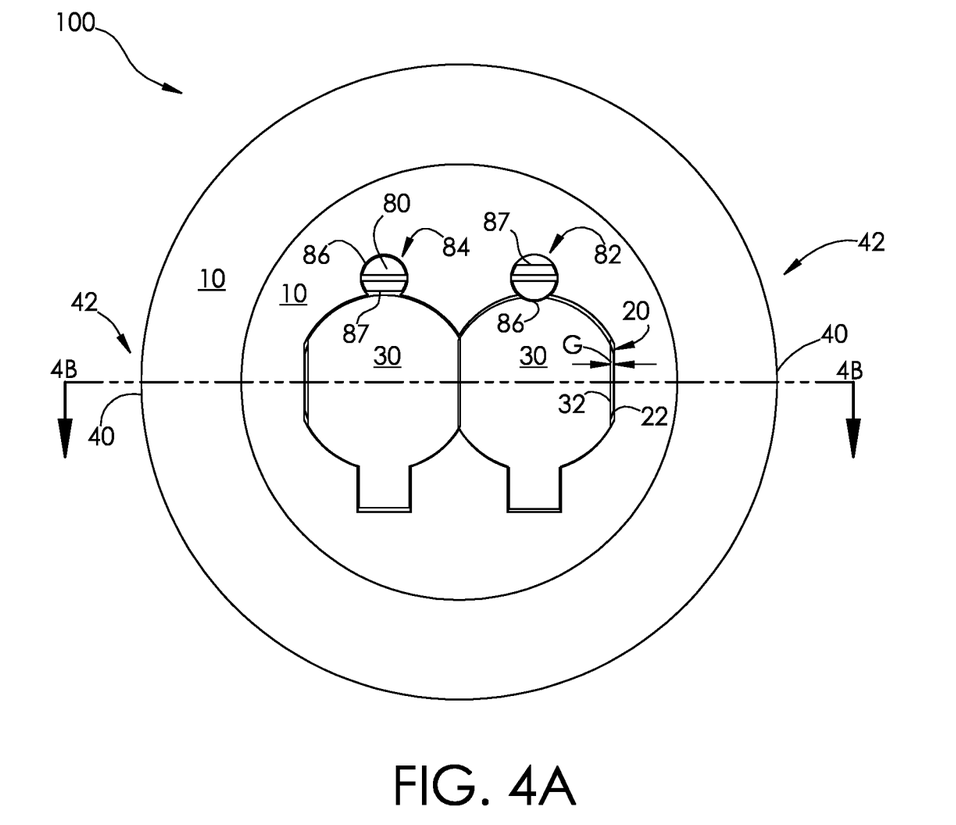
FIG. 4A depicts plan view of the assembly shown in FIG. 3, with a section line 4B-4B taken along a diameter of the assembly.
Figure 4B:
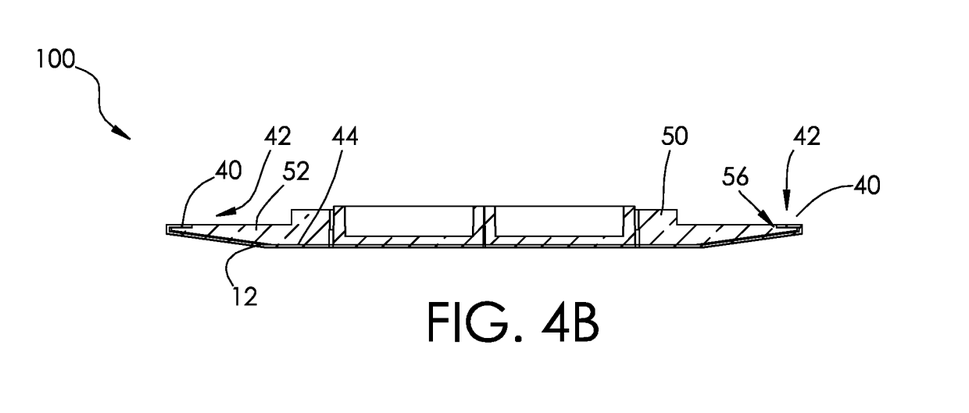
FIG. 4B shows a cross-sectional profile view of the assembly taken along the section line 4B-4B shown in FIG. 4A.

FIGS. 4A and 4B depict additional views of the assembly 100 depicted in FIG. 3. FIG. 4A depicts plan view of the assembly 100 shown in FIG. 3, with a section line 4B-4B taken along a diameter of the assembly 100. FIG. 4B shows a cross-sectional profile view of the assembly 100 taken along the section line 4B-4B shown in FIG. 4A. In the plan view of FIG. 4A, a first fastener 80 is shown in on the right side of FIG. 4A in a closed position 82, with a portion of the rounded head 86 disposed over, or in contact with, the colored hinged flap cover 30. As such, the first hinged flap 70 is prevented from opening and maintains the first flap 70 and its corresponding colored hinged flap cover 30, from moving to an open position 84, unless and until the first fastener 80 is moved to an open position 84.

In the plan view of FIG. 4A, a second fastener 80 is also shown. The second fastener 80 being on the left side of FIG. 4A in an open position 84, without a portion of the rounded head 86 disposed over, or in contact with, the colored hinged flap cover 30. Instead, the straight edge 87 of the second fastener 80 is shown adjacent the colored hinged flap cover 30, so as to allow the second hinged flap 70 to open, providing access to the underlying floor electrical outlet 90.

Figure 5:
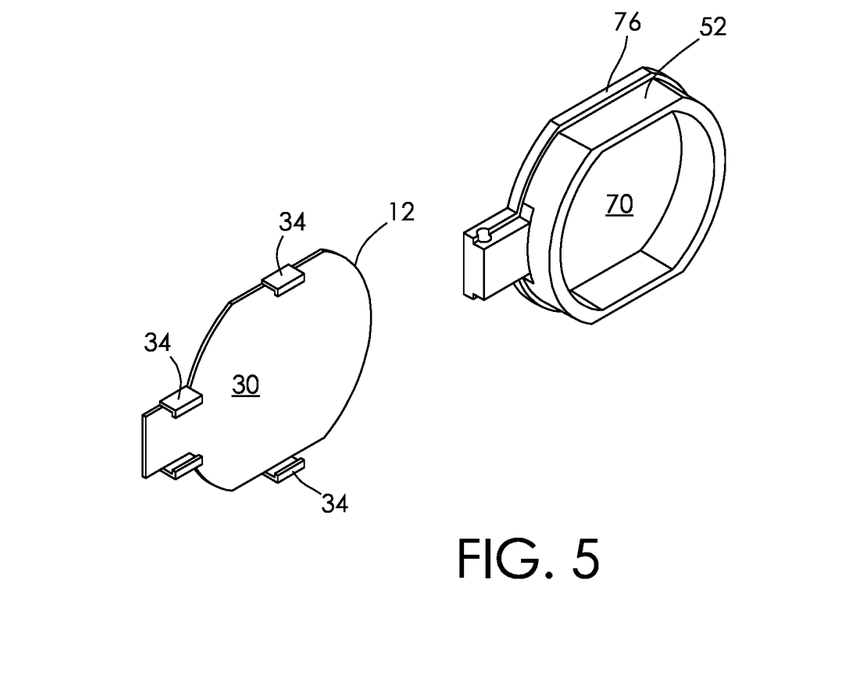
FIGS. 5-8 depict various views of colored hinged flap covers disposed over, or coupled to, corresponding hinged flaps.
Figure 6:
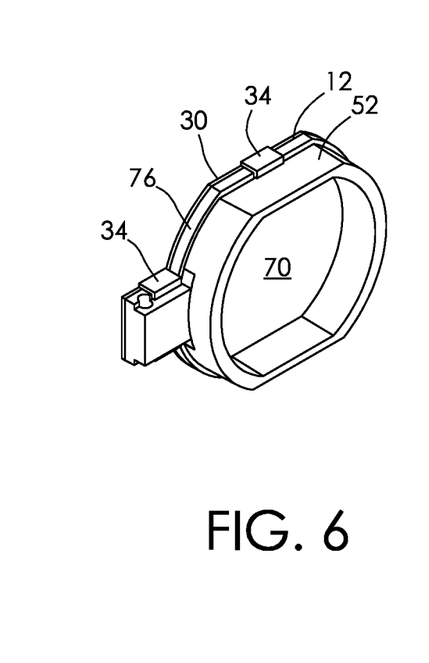

FIGS. 5-8 depict various views of colored hinged flap covers 30 disposed over, or coupled to, corresponding hinged flaps 70. More specifically, FIG. 5 depicts a colored hinged flap cover 30 at the left of FIG. 5 with four tabs 34 disposed along or around a perimeter 72 of the colored hinged flap cover 30. The right portion of FIG. 5 depicts a corresponding hinged flap 70, configured to receive or mateably couple with the colored hinged flap cover 30. FIG. 6, continuing from FIG. 5, shows the colored hinged flap cover 30 mateably coupled to the corresponding hinged flap 70, the four tabs 34 being press fit or snap fit around a lip, ridge, flange, or protuberance 76. In so doing, the first color 52 of the hinged flap 70 may be masked, covered, or made not visible to an observer when the colored hinged flap cover 30 is mateably coupled to the corresponding hinged flap 70, the hinged flap 70 being closed. Instead, the second color 12 of the colored hinged flap cover 30 is made visible to an observer when the colored hinged flap cover 30 and the hinged flap 70 are closed.

Figure 7:
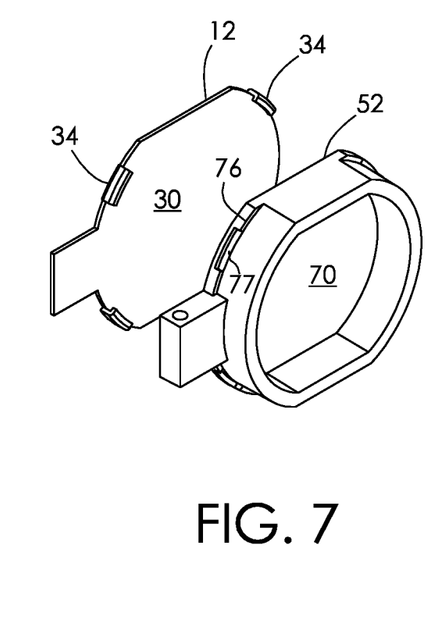
Figure 8:
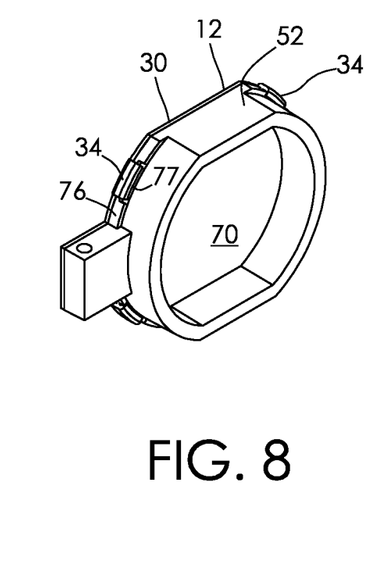

FIGS. 7 and 8, similar to FIGS. 5 and 6, depict another non-limiting example of a colored hinged flap cover 30 at the left of FIG. 7 with four tabs 34 disposed along or around a perimeter 72 of the colored hinged flap cover 30. The right portion of FIG. 7 depicts a corresponding hinged flap 70, configured to receive or mateably couple with the colored hinged flap cover 30. FIG. 8, continuing from FIG. 7, shows the colored hinged flap cover 30 mateably coupled to the corresponding hinged flap 70, the four tabs 34 being press fit or snap fit around a lip, ridge, flange, or protuberance 76 and seated within a recess, cut-out, or notch 77 in the hinged flap 70, such as in lip 76. In so doing, the first color 52 of the hinged flap 70 may be masked, covered, or made not visible to an observer when the colored hinged flap cover 30 is mateably coupled to the corresponding hinged flap 70, the hinged flap 70 being closed. Instead, the second color 12 of the colored hinged flap cover 30 is made visible to an observer when the colored hinged flap cover 30 and the hinged flap 70 are closed. FIGS. 7 and 8 differ from FIGS. 5 and 6 by positioning the tabs 34 and corresponding recesses 77 along curved portions of the perimeter 72, rather than along the flattened upper and lower portions of the perimeter 72 as shown in FIGS. 5 and 6.

FIGS. 9-13 depict additional aspects of colored electrical plate cover and floor electrical colors, similar to those depicted in FIGS. 1-8, but with the reference numbers increased by 100 for corresponding features or elements. Thus, for ease of description and in the interest of brevity, the features of assembly 200 will be similar or identical to those of assembly 100, unless otherwise noted.

Figure 9:
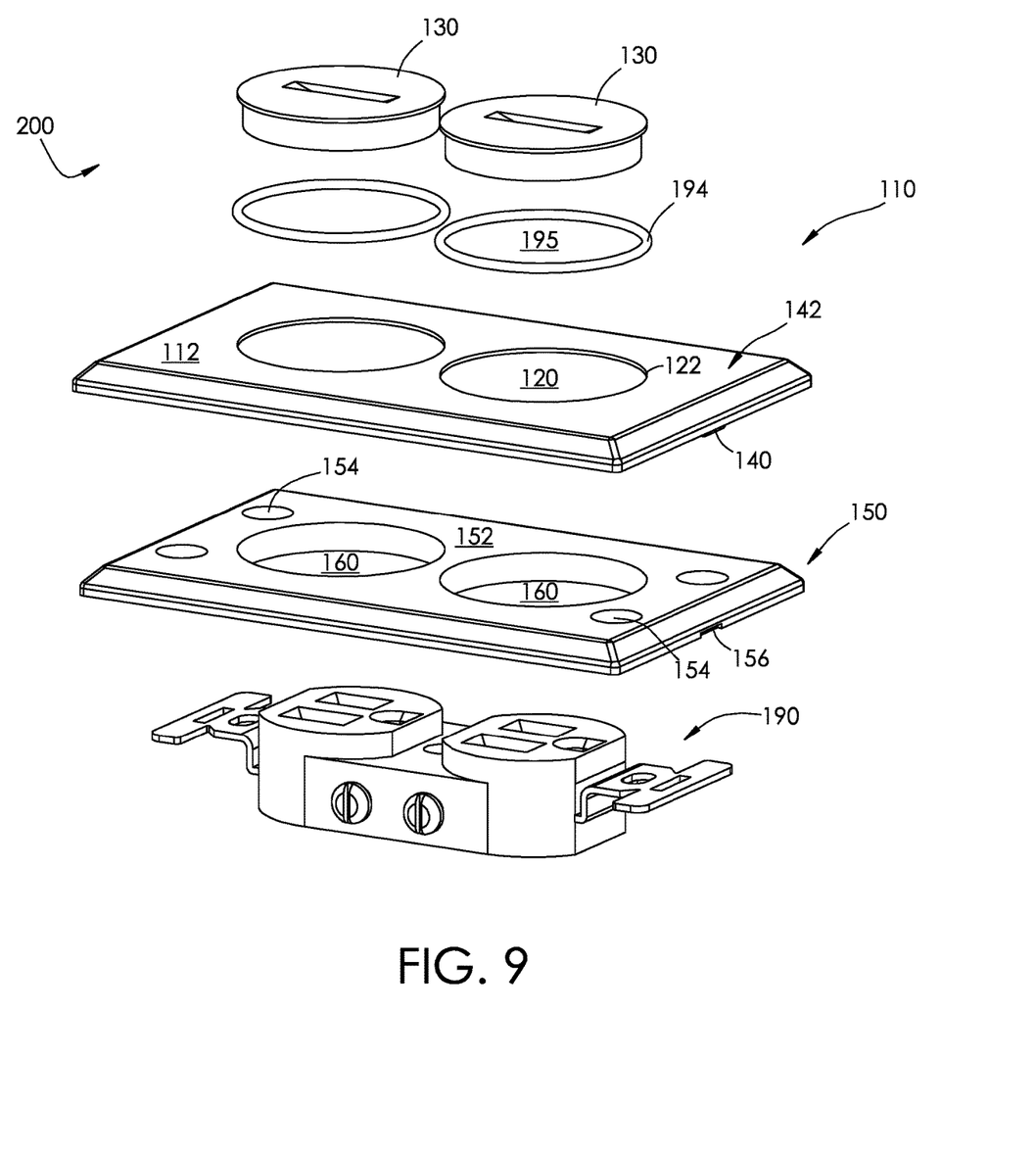
FIG. 9 depicts an exploded perspective view of a non-limiting implementation of an assembly comprising a colored electrical plate cover configured to be coupled to a floor electrical outlet cover.

FIG. 9 depicts an exploded perspective view of a non-limiting implementation of an assembly 200 comprising a colored electrical plate cover or faceplate 110 configured to be coupled to a floor electrical outlet cover or base 150, the floor electrical outlet cover 150 comprising a first color 152. The colored electrical plate cover or faceplate 110 may closely approximate the outer dimensions of the floor electrical outlet cover 150. The floor electrical outlet cover 150 may further comprise at least one opening 160 aligned with the floor electrical outlet 190, so that the electrical outlet 190 may be accessed and electrically coupled to power cords and various devices even when the electrical outlet cover 150 is coupled to the floor electrical outlet 190.

The floor electrical outlet cover 150 may also comprise at least one flap, or closure plug 170 that is not hingedly coupled to the floor electrical outlet cover 150, but is press fit, rotatably coupled with (such as being twisted or screwed into) the colored electrical plate cover or faceplate 110 and the floor electrical outlet cover 150. The flaps 170 may be disposed in a closed position 174 that restricts access to the floor electrical outlet 190, and an open position 175 that provides access to the floor electrical outlet 190. A gasket, ring, or seal 194 may be disposed between the one or more flaps 170 and the perimeters 122 of the respective openings 120 to provide a seal such that the floor electrical outlet cover 150 passes a water scrub test. In other words, the gasket 194 may provide sufficient friction against the floor electrical outlet cover 150 or between the floor electrical outlet cover 150 and the flaps 170, so as to limit or reduce an amount of water that may pass from outside the floor electrical outlet cover 150 to the floor electrical outlet 190.

Figure 10:
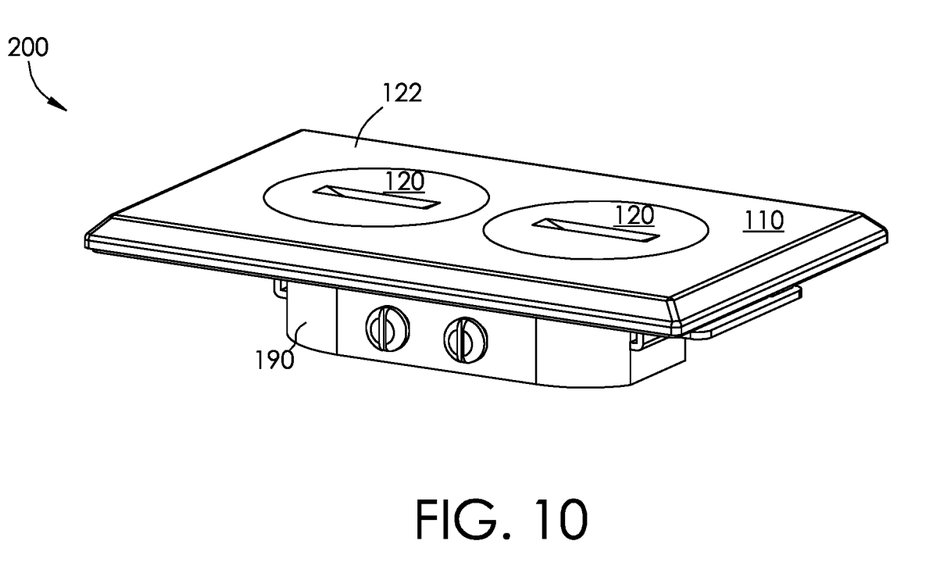
FIG. 10 depicts a non-exploded perspective view of the assembly from FIG. 9.

FIG. 10 depicts a non-exploded perspective view of the assembly 200 from FIG. 9, with the colored electrical plate cover 110 coupled to the floor electrical outlet cover 150 and the floor electrical outlet 190.

Figure 11A:
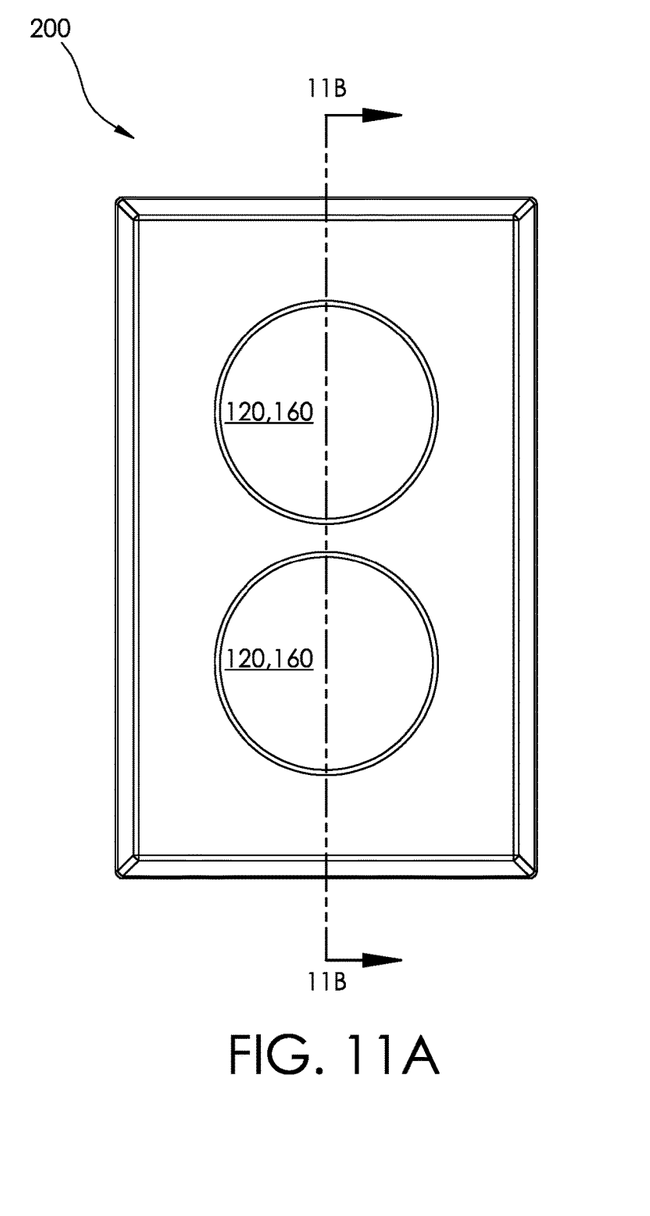
FIG. 11A depicts a plan view of the assembly shown in FIG. 10, with a section line 11B-11B taken along the assembly.
Figure 11B:
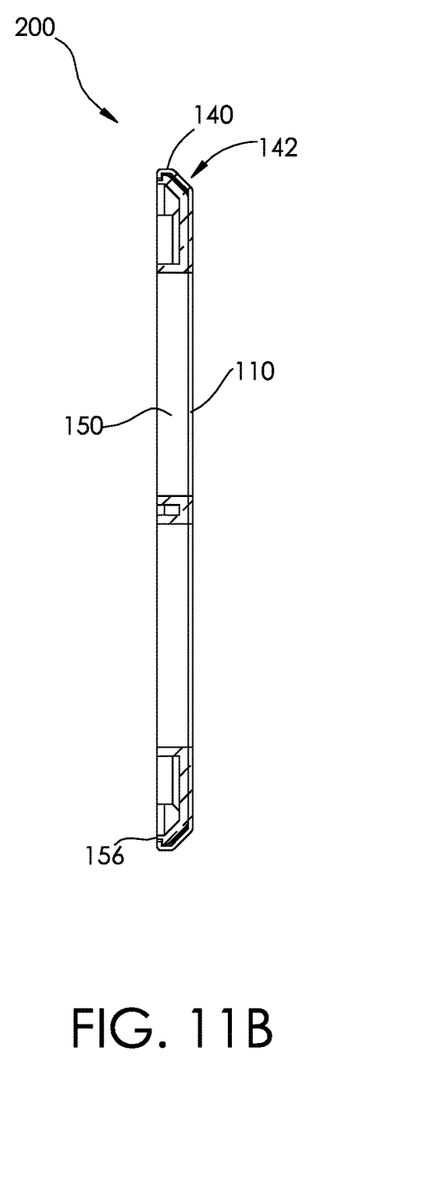
FIG. 11B shows a cross-sectional profile view of the assembly taken along the section line 11B-11B shown in FIG. 11A.

FIG. 11A depicts plan view of the assembly 200 of FIGS. 9 and 10, with a section line 11B-11B taken along a length or centerline of the assembly 200 and through the openings 120, 160. FIG. 11B shows a cross-sectional profile view of the assembly 200 taken along the section line 11B-11B shown in FIG. 11A.

FIG. 12 depicts an exploded perspective view of another non-limiting implementation of a floor electrical outlet cover or base 150 onto which colored electrical plate cover or faceplates 110 are mounted, the floor electrical outlet cover 150 being secured, such as at its ends, with mechanical fasteners 157, such as screws.

FIG. 13A depicts plan view of the assembly 200 of FIG. 12, with a section line 13B-13B taken along the length of the plate along its center. FIG. 13B shows a cross-sectional view of the plate taken along the section line 13B-13B shown in FIG. 13A. In both FIGS. 13A and 13B, the mechanical fasteners 157 are covered and obscured from view by the colored electrical plate cover 110.

It will be understood that outlet cover implementations are not limited to the specific assemblies, devices and components disclosed in this document, as virtually any assemblies, devices and components consistent with the intended operation of an outlet cover implementation may be utilized. Accordingly, for example, although particular outlet covers, lids, sleeves, latches, snap-fit couplers, hinges, frames, enclosures, bubble covers, housings, joints, protrusions, ledges, clamps, grooves, ridges, couplers, fasteners, power sockets, and other assemblies, devices and components are disclosed, such may include any shape, size, style, type, model, version, class, measurement, concentration, material, weight, quantity, and/or the like consistent with the intended operation of an outlet cover implementation. Implementations are not limited to uses of any specific assemblies, devices and components; provided that the assemblies, devices and components selected are consistent with the intended operation of an outlet cover implementation.

Accordingly, the components defining any outlet cover implementations may be formed of any of many different types of materials or combinations thereof that can readily be formed into shaped objects provided that the components selected are consistent with the intended operation of an outlet cover implementation. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as quartz glass), carbon-fiber, aramid-fiber, any combination thereof, and/or other like materials; composites and/or other like materials; metals, such as zinc, magnesium, titanium, copper, lead, iron, steel, carbon steel, alloy steel, tool steel, stainless steel, brass, nickel, tin, antimony, pure aluminum, 1100 aluminum, aluminum alloy, any combination thereof, and/or other like materials; alloys, such as aluminum alloy, titanium alloy, magnesium alloy, copper alloy, any combination thereof, and/or other like materials; any other suitable material; and/or any combination of the foregoing thereof.

For the exemplary purposes of this disclosure, sizing, dimensions, and angles of outlet cover implementations may vary according to different implementations.

Various outlet cover implementations may be manufactured using conventional procedures as added to and improved upon through the procedures described here. Some components defining outlet cover implementations may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

It will be understood that the assembly of outlet covers are not limited to the specific order of steps as disclosed in this document. Any steps or sequence of steps of the assembly of outlet covers indicated herein are given as examples of possible steps or sequence of steps and not as limitations, since various assembly processes and sequences of steps may be used to assemble outlet covers.

The outlet cover implementations described are by way of example or explanation and not by way of limitation. Rather, any description relating to the foregoing is for the exemplary purposes of this disclosure, and implementations may also be used with similar results for a variety of other applications requiring a configurable outlet cover.

What is claimed is:
1. A colored electrical plate cover, comprising:
a floor electrical outlet cover disposed over and coupled to a floor electrical outlet, the floor electrical outlet cover comprising a first color and further comprising:
at least one opening aligned with the floor electrical outlet, and
at least one hinged flap hingedly coupled to the floor electrical outlet cover, the hinged flap configured to move from a closed position that restricts access to the floor electrical outlet to an open position that provides access to the floor electrical outlet;
an electrical plate cover comprising a second color different from the first color and comprising a structural element with portions of the structural element positioned on opposing sides of the electrical plate cover, the structural element configured to couple the electrical plate cover to the floor electrical outlet cover, the electrical plate cover further comprising:
at least one opening aligned with the at least one opening in the floor electrical outlet cover, the at least one opening providing a gap between a perimeter of the at least one opening and the at least one hinged flap, and at least one hinged flap cover comprising at least one tab to mateably snap-fit to the hinged flap, the at least one tab sized to fit within the gap between the perimeter of the at least one opening and the at least one hinged flap; and a fastener disposed adjacent the at least one hinged flap, the fastener configured to move from a closed position that restricts opening the hinged flap to an open position that allows for unrestricted opening of the hinged flap.

2. The colored electrical plate cover of claim 1, wherein the fastener comprises a rounded head and a straight edge along a portion of a perimeter of the head.

3. The colored electrical plate cover of claim 1, further comprising the floor electrical outlet cover coupled to the floor electrical outlet with a gasket disposed between the floor electrical outlet cover and the floor electrical outlet such that the floor electrical outlet cover passes a water scrub test.

4. The colored electrical plate cover of claim 1, wherein the structural element comprises tracks in the electrical plate cover aligned with screws in the floor electrical outlet cover.

5. The colored electrical plate cover of claim 1, wherein the structural element comprises corresponding tracks formed as grooves or ridges in the electrical plate cover and the floor electrical outlet cover to facilitated sliding of the electrical plate cover onto the floor electrical outlet cover.

6. The colored electrical plate cover of claim 1, wherein the structural element comprises tabs or recesses formed on opposing ends of the electrical plate cover configured to snap fit to the floor electrical outlet cover.

7. The colored electrical plate cover of claim 1, wherein the structural element comprises an adhesive or double-sided tape disposed between the electrical plate cover and the floor electrical outlet cover.

8. The colored electrical plate cover of claim 1, wherein the second color comprises a brass, nickel, gray, silver, or gold color.

9. The colored electrical plate cover of claim 1, wherein the fastener comprises a black color.

10. The colored electrical plate cover of claim 1, wherein the electrical plate cover is removably coupled to the floor electrical outlet cover and the electrical plate cover masks any fasteners used to attach the floor electrical outlet cover to the floor electrical outlet.

11. A colored electrical plate cover, comprising:
a floor electrical outlet cover disposed over and coupled to a floor electrical outlet, the floor electrical outlet cover comprising a first color and further comprising:
at least one opening aligned with the floor electrical outlet, and
at least one flap coupled to the floor electrical outlet cover, the flap configured to move from a closed position that restricts access to the floor electrical outlet to an open position that provides access to the floor electrical outlet; and an electrical plate cover comprising a second color different from the first color and comprising a structural element configured to couple the electrical plate cover to the floor electrical outlet cover, the electrical plate cover further comprising:
at least one opening aligned with the at least one opening in the floor electrical outlet cover and sized such that it provides a gap between a perimeter of the at least one opening of the electrical plate cover and the at least one flap, and
at least one flap cover coupled to the flap, the at least one flap cover comprising at least one tab to mateably snap-fit to the flap, wherein the at least one tab is sized to fit within the gap between the perimeter of the at least one opening and the at least one flap.

12. The colored electrical plate cover of claim 11, wherein the at least one flap comprises at least one hinged flap hingedly coupled to the floor electrical outlet cover.

13. The colored electrical plate cover of claim 11, further comprising portions of the structural element positioned on opposing sides of the electrical plate cover.

14. The colored electrical plate cover of claim 11, wherein the structural element comprises tabs or recesses formed on opposing ends of the electrical plate cover configured to snap fit to the floor electrical outlet cover.

15. A colored electrical plate cover configured to be coupled to a floor electrical outlet cover comprising a first color, comprising:
an electrical plate cover comprising a second color different from the first color and comprising a structural element configured to couple the electrical plate cover to the floor electrical outlet cover, the electrical plate cover further comprising:
at least one opening aligned with an opening in the floor electrical outlet cover and sized such that it provides a gap between a perimeter of the at least one opening of the electrical plate cover and at least one flap of the floor electrical outlet cover, and
at least one flap cover coupled to the at least one flap, the at least one flap cover comprising at least one tab to mateably snap-fit to the at least one flap, wherein the at least one tab is sized to fit within the gap between the perimeter of the at least one opening and the at least one flap.

16. The colored electrical plate cover of claim 15, wherein the at least one flap comprises at least one hinged flap hingedly coupled to the floor electrical outlet cover.

17. The colored electrical plate cover of claim 15, further comprising portions of the structural element positioned on opposing sides of the electrical plate cover.

18. The colored electrical plate cover of claim 15, wherein the structural element comprises tabs or recesses formed on opposing ends of the electrical plate cover configured to snap fit to the floor electrical outlet cover.

* * * * *